S. E. ALLEN.
ACCELERATOR FOR WATER COOLED MACHINES.
APPLICATION FILED NOV. 1, 1920.

1,415,974.   Patented May 16, 1922.

Inventor
Scott E. Allen
by Graham + Harris
Attorneys

UNITED STATES PATENT OFFICE.

SCOTT E. ALLEN, OF LOS ANGELES, CALIFORNIA.

ACCELERATOR FOR WATER-COOLED MACHINES.

1,415,974. Specification of Letters Patent. Patented May 16, 1922.

Application filed November 1, 1920. Serial No. 421,130.

*To all whom it may concern:*

Be it known that I, SCOTT E. ALLEN, a citizen of the United States, residing at Los Angeles, in the county of Los Angeles and State of California, have invented a new and useful Accelerator for Water-Cooled Machines, of which the following is a specification.

My invention relates to machines in which water is circulated for the purpose of cooling. It is particularly applicable to internal combustion engines, air compressors, electric transformers, etc., in which currents set up by the surfaces with which the water is in contact are depended upon to circulate the water.

The invention is particularly applicable to internal combustion engines operating upon what is known as the thermo-siphon system, in which the circulation is dependent wholly upon such currents. There are a large number of automobiles in operation in the United States which use this system.

The principal object of the invention is to provide an accelerator by which the circulation may be greatly improved in thermo-siphon cooled automobiles and by which this circulation may be controlled by the driver of the automobile. My invention is particularly applicable to tractors and will be described as applied thereto.

Further objects and advantages will be made evident hereinafter.

Referring to the drawing which is for illustrative purposes only,

Figure 1:
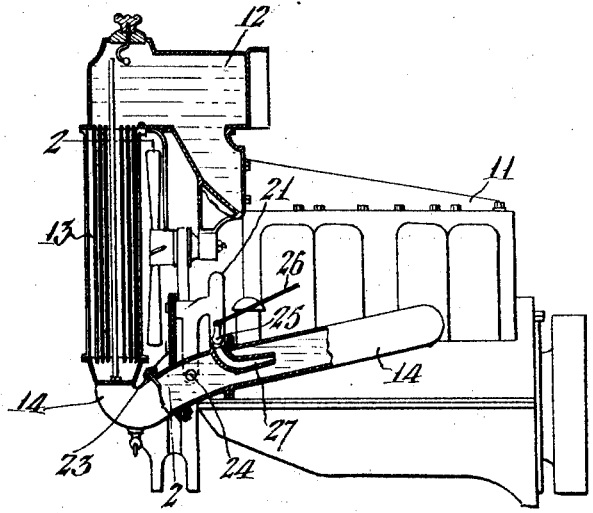
Fig. 1 is a side elevation partly in section of a well known make of tractor to which the system is applied.
Figure 2:
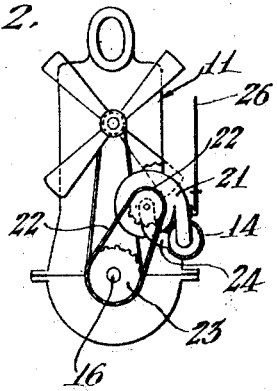
Fig. 2 is a section of the same on a plane represented by the line 2—2 of Fig. 1.
Figure 3:
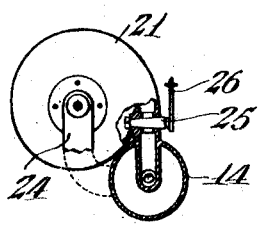
Fig. 3 is an enlarged view of the pump and valve.
Figure 4:
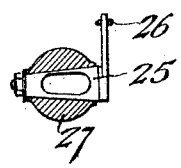
Fig. 4 is a section through the valve.

In the form of tractor to which the device is applied, an engine 11 is provided having a water jacket, the upper portion of the channels of which open into a water tank 12 which communicates with the top of a radiator 13. A water channel 14 is provided leading from the bottom of the radiator 13 and delivering cooled water to the engine 11. In the ordinary operation of this engine, the water is heated in the jacket of the engine and rapidly rising currents are formed therein. This heated water flows into the tank 12 and flows downwardly through the radiator 13 where it is cooled, being delivered to the channel 14 at a considerable lower temperature than it enters the radiator 13. In very hot countries or where the tractor or automobile must be subjected to excessive loads for considerable periods, this system of cooling is not sufficient and on the higher grade automobile, the thermo-siphon is not commonly used, but a water pump is supplied which positively circulates the water. This system of positive water circulation is, however, deficient in that it may supply too much water in cool weather and not enough in hot weather and in that it requires a relatively slow speed pump. I overcome these disadvantages in my invention in which I use a centrifugal pump 21 which may be driven by a chain 22 and sprocket 23 from the main shaft 16, of the engine. The centrifugal pump takes water from the channel 14 through a pipe 24. The pump 21 being driven at a high rate of speed, a very small and light centrifugal pump may be used, this pump forcing the water through a nozzle 27 into the interior of the channel 14 at a considerable velocity. This nozzle 27 is directed in the direction of the natural flow of the thermo-siphon system which tends to greatly accelerate the movement of the water, causing it to circulate at a rapid rate when the centrifugal pump is working at its maximum capacity. Situated in the channel leading to the nozzle 27 is a valve 25 controlled by a rod 26 which leads to the driver's seat. By opening and closing the valve 25, the operator of the machine can regulate very accurately the amount of acceleration, it being a peculiar property of a centrifugal pump that it will run with very little power if no water is supplied to it, and its output can be readily controlled by a valve in series therewith.

By the use of my embodiment of this invention, the operator of the tractor can regulate the rate of flow of the cooling water to suit the load imposed upon the tractor thus operating at all times the maximum efficiency. In tractors having the thermo-siphon system, it is possible by the installation of my device to greatly increase the available power due to the increased rate of circulation of the cooling water. As the use of tractors is very great in the hot and arid regions of the world, this increase in capacity becomes very important when applied to tractors. The same is true of the smaller and cheaper forms of automobiles which by the use of my invention can be operated at a higher efficiency and at a greater power especially in extremely hot regions.

I claim as my invention:

1. An accelerator for a thermo-siphon system of cooling comprising a pump taking water from said system; means for regulating the amount of said water so taken; and an injector nozzle so placed as to inject said water from said pump into said system.

2. A thermo-siphon system accelerator for an internal combustion engine having a radiator and a water jacket through which cooling water is forced, comprising a pump; a pipe delivering a portion of the cooled water from said radiator to said pump; a nozzle in the main stream of water passing to said engine; and a pipe for delivering the water from said pump to said nozzle.

3. A thermo-siphon system accelerator for an internal combustion engine having a radiator and a water jacket through which cooling water is forced, comprising a pump; a pipe delivering a portion of the cooled water from said radiator to said pump; a valve controlling the flow of water through said pipe; a nozzle in the main stream of water passing to said engine; and a pipe for delivering the water from said pump to said nozzle.

4. A thermo-siphon system accelerator for an internal combustion engine having a radiator and a water jacket through which cooling water is forced, comprising a centrifugal pump; a pipe delivering a portion of the cooled water from said radiator to said pump; a nozzle in the main stream of water passing to said engine; and a pipe for delivering the water from said pump to said nozzle.

5. A thermo-siphon system accelerator for an internal combustion engine having a radiator and a water jacket through which cooling water is forced, comprising a centrifugal pump; a pipe delivering a portion of the cooled water from said radiator to said pump; a valve controlling the flow of water through said pipe; a nozzle in the main stream of water passing to said engine; and a pipe for delivering the water from said pump to said nozzle.

6. The combination with a motor and its water jacket, a radiator with a pipe connecting said jacket and radiator; of an impelling device adapted to be operated by said motor, a watertight casing encompassing said device and having pipes tapping said first mentioned pipe, one of said last mentioned pipes being adapted to direct water into said casing, and the other of said last mentioned pipes being arranged to direct water from the casing into the first mentioned pipe and in the direction of flow of water therein.

In testimony whereof, I have hereunto set my hand at Los Angeles, California, this 25th day of October, 1920.

SCOTT E. ALLEN.